United States Patent
Kim et al.

(10) Patent No.: US 9,275,539 B2
(45) Date of Patent: Mar. 1, 2016

(54) APPARATUS AND METHOD FOR PROVIDING EMERGENCY ALERT SERVICE IN PORTABLE TERMINAL

(75) Inventors: Sung Gu Kim, Daegu (KR); Sang Hoon Kim, Gumi-si (KR); Dong Sub Kim, Gumi-si (KR); Yong Chul Yoon, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 903 days.

(21) Appl. No.: 12/625,272

(22) Filed: Nov. 24, 2009

(65) Prior Publication Data

US 2010/0127863 A1 May 27, 2010

(30) Foreign Application Priority Data

Nov. 27, 2008 (KR) ........................ 10-2008-0118492

(51) Int. Cl.
*G08B 25/00* (2006.01)
*G08B 5/22* (2006.01)
*G08B 27/00* (2006.01)
*H04M 11/04* (2006.01)
*H04B 7/00* (2006.01)
*H04M 1/00* (2006.01)
*H04B 1/38* (2015.01)
*H04W 24/00* (2009.01)
*H04B 7/14* (2006.01)
*G08B 25/01* (2006.01)
*H04M 1/725* (2006.01)

(52) U.S. Cl.
CPC ......... *G08B 25/016* (2013.01); *H04M 1/72541* (2013.01); *H04M 1/72547* (2013.01)

(58) Field of Classification Search
CPC .... G08B 25/12; G08B 25/016; G08B 15/004; G08B 21/0297; G08B 25/10; G08B 3/1016; H04M 1/72541; H04M 1/72519; H04M 1/0245; H04M 2242/04; H04M 1/605; H04M 1/72536; H04M 3/5116; H04M 1/7253; H04M 1/72538; H04M 1/72552
USPC ............................... 340/500; 455/90.1, 404.1
See application file for complete search history.

(56) References Cited

U.S. PATENT DOCUMENTS 3,683,114 A * 8/1972 Egan et al. ...................... 379/40
4,715,062 A * 12/1987 Korsky et al. ............. 379/406.04
4,804,954 A * 2/1989 Macnak et al. .............. 340/7.34

(Continued)

FOREIGN PATENT DOCUMENTS

GB        2 303 228 A      2/1997
JP        2001-268638 A    9/2001

(Continued)

*Primary Examiner* — Steven Lim
*Assistant Examiner* — Muhammad Adnan
(74) *Attorney, Agent, or Firm* — Jefferson IP Law, LLP

(57) ABSTRACT

An apparatus and method for providing an emergency alert service in a portable terminal and for generating an alarm for the emergency alert service are provided. The method includes detecting, by a controller, an SOS execution signal while the portable terminal is being operated in a certain mode, identifying, by the controller, a current operating mode of the portable terminal in response to the SOS execution signal, outputting a control signal according to the identified operating mode to a source audio signal processor, and outputting, by the source audio signal processor, a source audio signal according to an input port receiving the control signal.

19 Claims, 5 Drawing Sheets

(56) References Cited

U.S. PATENT DOCUMENTS

| | | | |
|---|---|---|---|
| 5,195,126 A * | 3/1993 | Carrier et al. | 379/45 |
| 5,305,370 A * | 4/1994 | Kearns et al. | 379/45 |
| 5,343,509 A * | 8/1994 | Dounies | 379/40 |
| 5,684,452 A * | 11/1997 | Wang | 340/321 |
| 5,694,452 A | 12/1997 | Bertolet | |
| 5,828,312 A * | 10/1998 | Yamazaki | 340/7.58 |
| 6,285,867 B1 * | 9/2001 | Boling et al. | 455/404.1 |
| 6,445,937 B1 * | 9/2002 | daSilva | 455/574 |
| 6,751,446 B1 * | 6/2004 | Kim et al. | 455/90.1 |
| 6,847,814 B1 * | 1/2005 | Vogeleisen | 455/404.1 |
| 6,879,819 B2 * | 4/2005 | Brooks | 455/404.1 |
| 7,076,236 B2 * | 7/2006 | Ihira | G08B 25/016 455/404.1 |
| 7,120,488 B2 * | 10/2006 | Nova et al. | 607/2 |
| 7,251,471 B2 * | 7/2007 | Boling et al. | 455/404.2 |
| 7,283,153 B2 * | 10/2007 | Provost et al. | 348/14.01 |
| 7,289,029 B2 * | 10/2007 | Medema et al. | 340/573.1 |
| 7,567,174 B2 * | 7/2009 | Woodard et al. | 340/539.26 |
| 8,315,589 B2 * | 11/2012 | Li | H04W 48/18 455/404.1 |
| 8,437,729 B2 * | 5/2013 | Ewell et al. | 455/404.1 |
| 8,538,370 B2 * | 9/2013 | Ray et al. | 455/404.1 |
| 8,548,421 B2 * | 10/2013 | Ray et al. | 455/404.1 |
| 8,983,422 B2 * | 3/2015 | Park | H04W 4/22 455/404.1 |
| 2003/0032457 A1 * | 2/2003 | Leung | G08B 3/1041 455/567 |
| 2004/0204012 A1 * | 10/2004 | Kakinuma | 455/550.1 |
| 2005/0040954 A1 * | 2/2005 | McNally | 340/573.3 |
| 2005/0187896 A1 | 8/2005 | Mousseau | |
| 2006/0019638 A1 * | 1/2006 | Chiu | G06Q 10/109 155/412.2 |
| 2007/0042747 A1 * | 2/2007 | Sun | 455/403 |
| 2008/0037718 A1 * | 2/2008 | Logan | 379/67.1 |
| 2008/0096521 A1 * | 4/2008 | Boling et al. | 455/404.2 |
| 2009/0278506 A1 * | 11/2009 | Winger | H02J 7/0068 320/160 |

FOREIGN PATENT DOCUMENTS

| | | |
|---|---|---|
| JP | 2005-184102 A | 7/2005 |
| KR | 10-2001-0064904 A | 7/2001 |

* cited by examiner

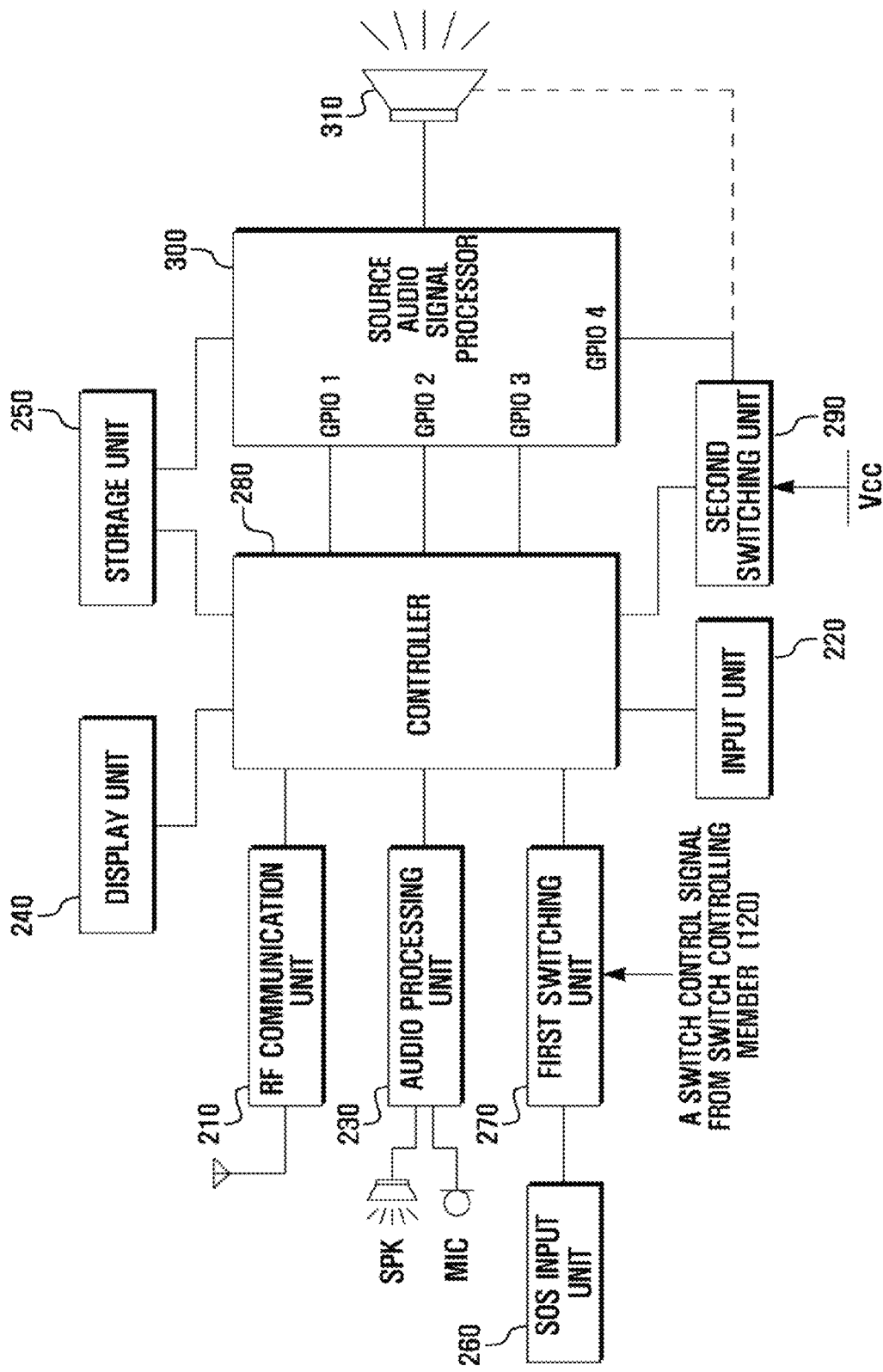

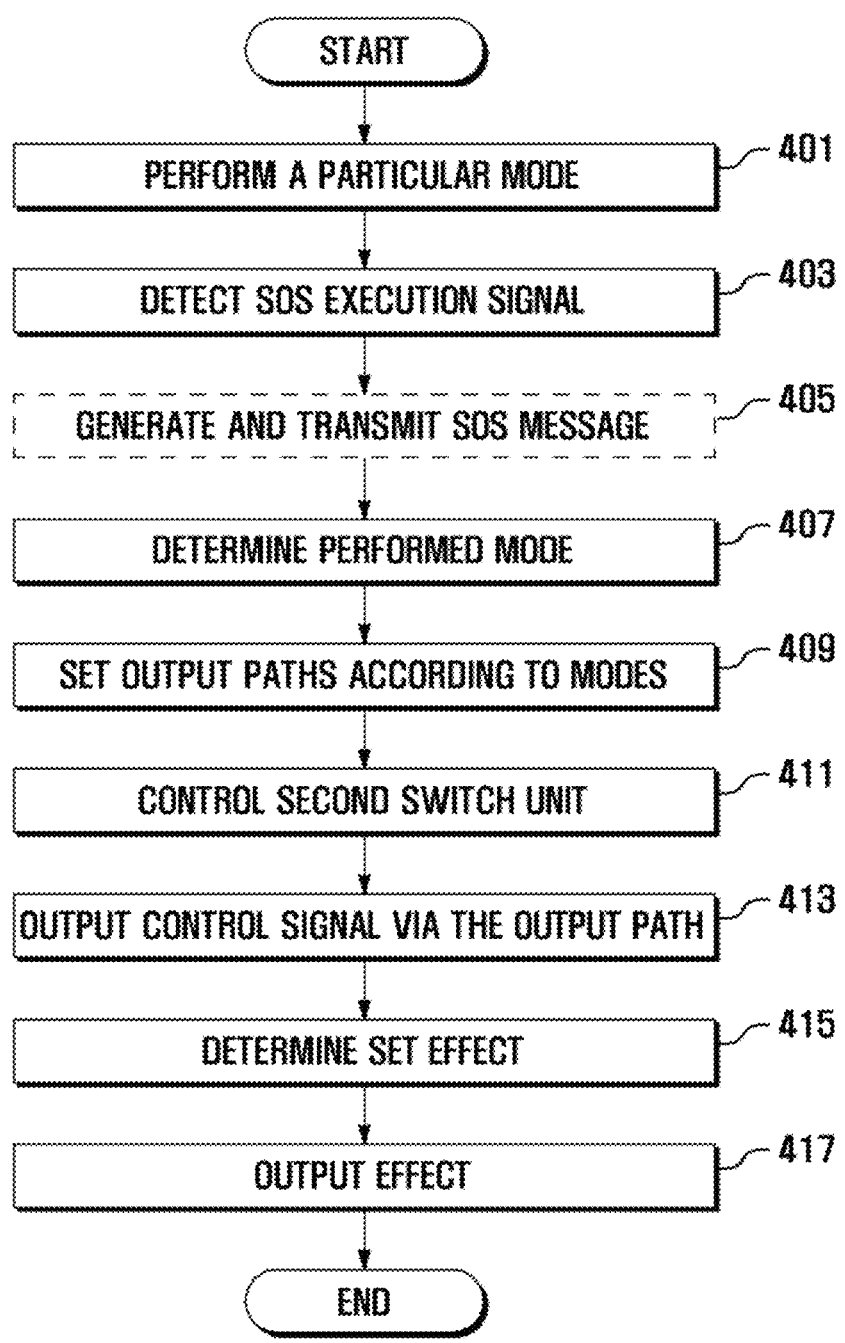

APPARATUS AND METHOD FOR PROVIDING EMERGENCY ALERT SERVICE IN PORTABLE TERMINAL

PRIORITY

This application claims the benefit under 35 U.S.C. §119(a) of a patent application filed in the Korean Intellectual Property Office on Nov. 27, 2008 and assigned Ser. No. 10-2008-0118492, the entire disclosure of which is hereby incorporated by reference.

BACKGROUND OF THE INVENTION

1. Field of the Invention

The present invention relates to functions of portable terminals. More particularly, the present invention relates to an apparatus and method for providing an emergency alert service in a portable terminal.

2. Description of the Related Art

Recently, conventional portable terminals have been equipped with a variety of functions to meet a user's needs. For example, the functions include Electronic-mail (E-mail), Internet services, games, and the like. More particularly, the portable terminals can provide a multimedia function to transmit video data.

The portable terminals periodically communicate with a base station in a local area where they are located, and report their current locations to the base station. When a portable terminal moves from an area covered by a base station to an area covered by another base station based on movement, the portable terminal also changes its current base station to the base station in the area to which the portable terminal has moved.

If a portable terminal user is involved in an emergency situation, such as a traffic accident, an accident in a remote location, a kidnapping, and the like, he/she must make a call with the portable terminal to inform his/her acquaintance, a police station, or an emergency rescue station of the emergency situation. However, making a call, connecting and informing his/her acquaintance, a police station or an emergency rescue station of his/her emergency situation takes a relatively long time. More particularly, the user may be in a condition where he/she cannot make a call.

To address this problem, portable terminals are equipped with an emergency alert function for informing others of an emergency situation. The emergency alert function (i.e., an emergency alert service) refers to a function that allows an emergency alert message (i.e., an 'SOS' message) to be transmitted to a called party, set by a portable terminal user, if the portable terminal user is an emergency situation, thereby informing the called party of the emergency situation of the portable terminal user. When the called portable terminal receives an SOS message, the portable terminal makes a call to the phone number transmitted with the SOS message, so that the emergency situation can be properly handled.

However, in order to provide the emergency alert service, conventional technology requires a called portable terminal to constantly be in an idle mode. That is, if the called portable terminal is making a call or operating in a particular mode, such as a camera mode, and the like, it cannot provide the emergency alert service. Also, when a portable terminal requests an emergency alert service, it generates and transmits an SOS message to a previously set called portable terminal but does not create any alarm.

Accordingly, in order to provide an emergency alert service, the conventional portable terminals are dependent on their current operating modes. Therefore, the called party of the portable terminal cannot be informed of the users' emergency. If a portable terminal user is involved in an emergency situation, such as an accident in a remote location or confinement in a closed space, his/her acquaintance, a police station or an emergency rescue station receives a belated SOS message and cannot immediately react to the emergency situation. In this case, the portable terminal user may instead inform people in the vicinity of his/her emergency. However this action requires the user to use his/her voice, which may be impossible in an emergency situation. Therefore, he/she must cope with the emergency situation solely via an SOS message.

Conventional portable terminals execute an emergency alert function as their input means is operated. The user, however, may accidentally operate the input means, causing an emergency alert function. If the called portable terminal receives an SOS message caused by the portable terminal user's accidental operation, the portable terminal generates an alarm which may cause embarrassment for the portable terminal user.

Therefore, a need exists for an apparatus and method for providing an emergency alert service in a portable terminal during various operating modes and for providing an alarm during the emergency alert service.

SUMMARY OF THE INVENTION

An aspect of the present invention is to address at least the above-mentioned problems and/or disadvantages and to provide at least the advantages described below. Accordingly, an aspect of the present invention is to provide a system for efficiently managing an emergency alert service in a portable terminal.

Another aspect of the present invention is to provide a method and apparatus for performing an emergency alert service in a portable terminal, irrespective of a current state or a current operation mode of the portable terminal.

Still another aspect of the present invention is to provide a method and apparatus for allowing a portable terminal requesting an emergency alert service to output a source audio signal, set according to the emergency alert service, and to generate an alarm sound when the emergency alert service is performed.

Yet another aspect of the present invention is to provide a method and apparatus for controlling a source audio signal, output when an emergency alert service is performed in a portable terminal, according to a current operation mode of the portable terminal.

A further aspect of the present invention is to provide a method and apparatus for processing a source audio signal, output according to an emergency alert service, to have a soundproof portion for a certain period of time according to a current operation mode of the portable terminal, and for outputting the processed source audio signal, or for delaying transmission of the source audio signal for a certain period of time and outputting the delayed source audio signal.

Another aspect of the present invention is to provide a method and apparatus for allowing a portable terminal user to control activation and deactivation of an emergency alert function in a portable terminal and for preventing an unnecessary emergency alert service from being generated due to the user's accidental operation.

In accordance with an aspect of the present invention, the present invention provides a method for providing an emergency alert service in a portable terminal. The method includes detecting, by a controller, an SOS execution signal while the portable terminal is being operated in a certain mode, identifying, by the controller, a current operating mode of the portable terminal in response to the SOS execution signal, outputting a control signal according to the identified operating mode to a source audio signal processor, and outputting, by the source audio signal processor, a source audio signal according to an input port receiving the control signal.

In accordance with another aspect of the present invention, the present invention provides a portable terminal. The portable terminal includes an SOS input unit for generating an SOS execution signal in response to a request, a first switching unit for transferring or breaking the SOS execution signal, a controller for detecting the SOS execution signal passed via the first switching unit, identifying an operating mode of the portable terminal, and generating a control signal according to the identified operating mode, and a source audio signal processor for outputting a preset source audio signal corresponding to a mode input port receiving a control signal of the controller.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 2 is a schematic block diagram illustrating a portable terminal according to an exemplary embodiment of the present invention;

FIG. 4 is a flowchart describing a control operation for providing an emergency alert service in a portable terminal according to an exemplary embodiment of the present invention.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a portable terminal which provides an emergency alert service irrespective of its operation modes, outputs an effect set therein, and generates an alarm sound. When an emergency alert service is requested, the portable terminal detects its current operation mode, calls an effect corresponding to the detected mode, and then outputs the effect to the output unit.

More particularly, if the portable terminal outputs a source audio signal according to the emergency alert service in a call mode, the portable terminal processes the source audio signal to have a soundproof portion for a certain section or a certain period of time in order to protect the portable terminal user or delays transmission of the source audio signal for a certain period of time, and then outputs the processed source audio signal.

In the following description, the configuration of the portable terminal according to an exemplary embodiment of the present invention is explained in detail with reference to FIG. 1.

Figure 1:
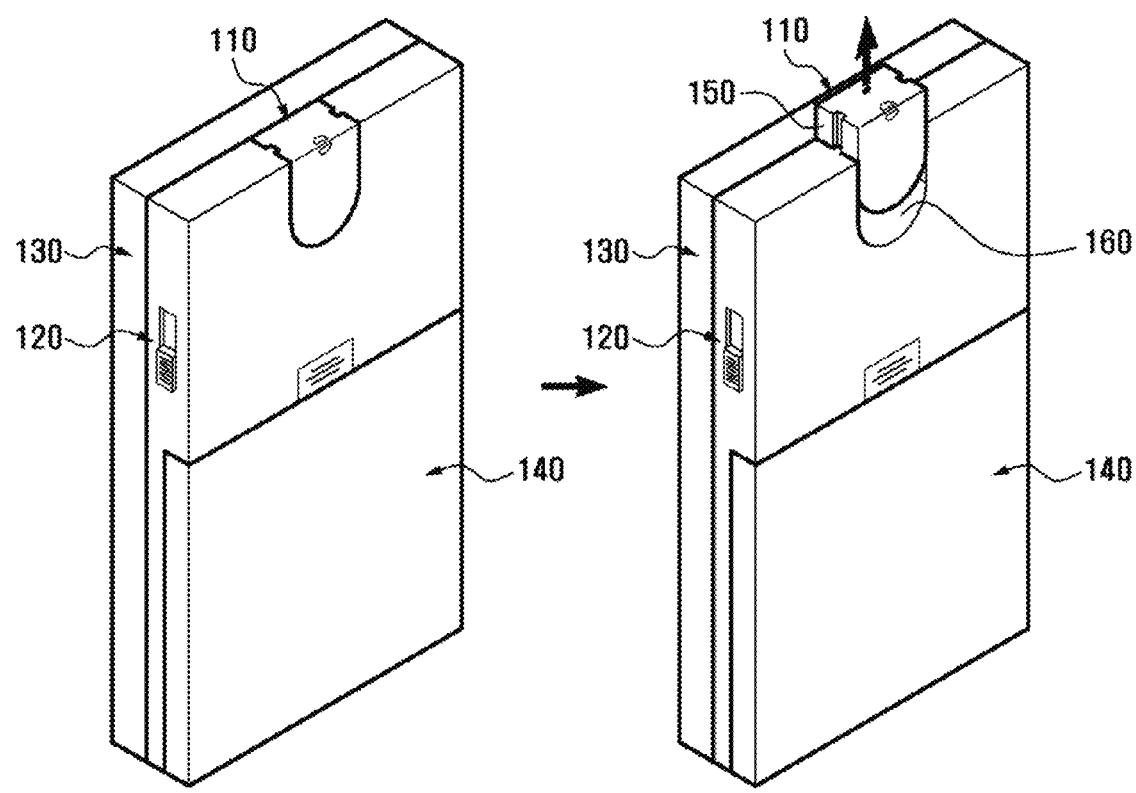
FIG. 1 is a schematic view illustrating a portable terminal configuration according to an exemplary embodiment of the present invention.

FIG. 1 is a schematic view illustrating a portable terminal configuration according to an exemplary embodiment of the present invention.

Referring to FIG. 1, the portable terminal includes an SOS input unit 110 and a switch controlling unit 120, which are used to provide an emergency alert service.

The SOS input unit 110 serves as a means for generating an SOS signal to provide an emergency alert service. The SOS input unit 110 may be installed to the rear side of the portable terminal's body 130. In an exemplary implementation, the SOS input unit 110 may be configured to include a sliding structure. That is, the SOS input unit 110 is formed in such a way that a sliding body 150 of the sliding structure has sliding grooves 160 and is slidably received by a receiving space formed in the body 130 of the portable terminal. When the sliding body 150 is slidably moved away from the body 130, the receiving space of the body 130 is generated between the sliding body 150 and the body 130 of the portable terminal.

In the sliding body 150 and the receiving space, a fixing unit (not illustrated) and a receiving unit for receiving the fixing unit (not illustrated) are formed to prevent the sliding body 150 from being separated from the body 130 when the sliding body 150 is slidably moved away from the body 130. Furthermore, the sliding body 150 is slidably coupled to the receiving space by hinges. The hinges assist the sliding motion of the sliding body 150 with respect to the receiving space. Accordingly, the sliding body 150 may be stably and smoothly moved to and from the body 130 of the portable terminal.

In an exemplary implementation, when the sliding body 150 is moved away from the body 130, the SOS input unit 110 generates an SOS signal to perform an emergency alert function. The sliding body 150 contains a signal pattern circuit for initiating the generation of the SOS signal. The receiving space contains a pattern circuit corresponding to the signal pattern circuit of the sliding body 150. Therefore, when the sliding body 150 is slidably moved toward the body 130 and the pattern circuit of the body 130 contacts the signal pattern circuit of the sliding body 150, the SOS signal is generated.

The signal pattern circuit of the sliding body 150 may be implemented with a switch. In this case, when the sliding body 150 is slidably moved toward the body 130 of the portable terminal, the signal pattern circuit functions as a switch to connect the sliding body 150 and the receiving space. That is, the signal pattern circuit functioning as a switch is switched on.

The switch controlling unit 120 refers to a means that generates a control signal for switching on/off a first switching unit 270 (illustrated in FIG. 2) in order to prevent inoperable and an accidental operation with respect to an emergency alert service. That is, the switch controlling unit 120 locks the emergency alert function. The switching controlling unit 120 may be installed to one side of the body 130 of the portable terminal.

The switch controlling unit 120 may be implemented with an ON/OFF switch. A detailed description of the ON/OFF switch is well-known technology and thus will not be explained in detail in this application. In an exemplary implementation, the emergency alert function is locked or unlocked according to whether the switch controlling unit 120 is switched on/off. Therefore, it should be understood that the configuration of the switch controlling unit 120 is not limited to the exemplary embodiments of the present invention. However, the switch controlling unit 120 may be implemented with various types of means and structures only if the means and structures can generate a control signal for locking/unlocking the emergency alert function.

The portable terminal includes a battery receiving unit 140, to which a battery is placed, in the backside of the body 130. The battery receiving unit 140 forms a battery receiving space in which the battery is placed and includes a cover that is detachably coupled to the body 130 in order to cover the battery placed therein. The battery forms a signal pattern circuit to supply electrical power to the portable terminal. The battery receiving space forms a pattern circuit corresponding to the signal pattern of the battery. The pattern circuit formed in the battery receiving space contacts the signal pattern of the battery.

In an exemplary implementation, the battery serves as a power supply that supplies electrical power to all elements in the portable terminal. A source audio signal processing unit 300 and an output unit 310, which will be explained below with reference to FIG. 2, may receive electrical power from the battery as the second switching unit 290 is switched on according to a control signal of the controller. Accordingly, receiving power from the battery prevents the source audio signal processing unit 300 and the output unit 310 from consuming electrical power when an emergency alert function is not performed or to prevent the output of a source audio signal corresponding to an emergency alert function by a user's accidental operation.

As described above, the portable terminal is configured in such a way that the SOS input unit 110 is installed to the backside of the body 130 of the portable terminal and the switch controlling unit 120 is formed on one side of the body 130.

However, it should be understood that the configuration of the portable terminal is not limited thereto. For example, according to the type of portable terminal, the SOS input unit 110 and the switch controlling unit 120 may be installed to the front and on another side of the body 130 of the portable terminal, respectively. The SOS input unit 110 and the switch controlling unit 120 may also be installed to the front and the back of the body 130, respectively. The SOS input unit 110 and the switch controlling unit 120 both may also be installed to the front or back of the body 130. Therefore, it will be appreciated that the SOS input unit 110 and the switch controlling unit 120 may be installed to various locations of the body 130 of the portable terminal, according to the type of portable terminal.

According to the type of portable terminal or operating methods of the portable terminal, the portable terminal may be classified into a flip-type, a folder type, a bar type and a sliding type. It will be appreciated that exemplary embodiments of the present invention may be applied to all the classified types of the portable terminal.

It should be understood that an external configuration of the portable terminal is not limited to the illustration in FIG. 1. It will be appreciated that the present invention may be applied to all portable terminals that include a means (i.e., an SOS input unit 110) for generating an SOS execution signal to provide an emergency alert service and a means (i.e., a switch controlling unit 120) serving as a locking function to prevent the accidental operation or abuse of an emergency alert service.

In the foregoing description, the portable terminal according to an exemplary embodiment of the present invention has been described based on a mobile communication terminal. It should be understood that the present invention is not limited thereto. Accordingly, the present invention may be applied to a variety of portable terminals. For example, the portable terminal may be applied to all types of mobile communication terminals that are operated according to communication protocols corresponding to a variety of communication systems. The portable terminal may also be applied to all information communication devices, multimedia devices, and their applications, such as, a Portable Multimedia Player (PMP), a Moving Picture Experts Group Audio Layer 3 (MP3) player, a digital broadcast player, a Personal Digital Assistant (PDA), a smart phone, and the like.

In the foregoing description, an external configuration of the portable terminal according to an exemplary embodiment of the present invention has been explained. It should be understood that the present invention is not limited thereto. Accordingly, the present invention may be applied to all portable terminals if they are configured in such a way to generate an SOS execution signal for providing an emergency alert service according to a switch control.

In the following description, an internal configuration of the portable terminal is explained in more detail with reference to FIG. 2. The portable terminal controls an emergency alert function through the input means described above. It should be understood that the present invention is not limited thereto. It will be appreciated that a variety of modifications may be applied to the portable terminal.

FIG. 2 is a schematic block diagram illustrating a portable terminal according to an exemplary embodiment of the present invention. Although the portable terminal is explained based on a mobile communication terminal, it should be understood that the present invention is not limited thereto.

Referring to FIG. 2, the portable terminal includes a Radio Frequency (RF) communication unit 210, an input unit 220, an audio processing unit 230, a display unit 240, a storage unit 250, an SOS input unit 260, a first switching unit 270, a controller 280, a second switching unit 290, a source audio signal processor 300 and an output unit 310.

The RF communication unit 210 allows the portable terminal to communicate with other portable terminals. The RF communication module 210 establishes a communication channel with a mobile communication system and performs voice communication and data communication therethrough. The RF communication unit 210 may be configured to include an RF transmitter for up-converting the frequency of transmitted signals and amplifying the transmitted signals and an RF receiver for low-noise amplifying received RF signals and down-converting the frequency of the received RF signals. In an exemplary implementation, the RF communication unit 210 transmits a message (i.e., an SOS message) related to an emergency alert service and receives a call connection signal responding to the transmitted message, according to the control of the controller 280. If the portable terminal is implemented with an MP3 player, a PMP, and the like, an RF communication unit 210 may not be included. Accordingly, the portable terminal does not perform generation and transmission of an SOS message but processes and outputs a source audio signal.

The input unit 220 receives a variety of text information and outputs signals related to settings for a variety of functions and control signals to the controller 280. The input unit 220 generates an input signal according to a user's operation. Accordingly, the input unit 220 may be implemented with a keypad or a touch pad. The input unit 220 may also be implemented with a touch screen. In this case, the input unit 220 may also serve as a display unit 240.

More particularly, the input unit 220 may further include function keys, such as direction keys set for performing particular functions, a volume key, a hotkey, and the like. In an exemplary implementation, the SOS input unit 110 and the switch controlling unit 120 may be implemented by one of the function keys described above or additional keys. A portable terminal user operates a function key, corresponding to the SOS input unit 110, to request an emergency alert service from his/her portable terminal. The user operates a function key, corresponding to the switch controlling unit 120, to control a switch (i.e., the first switching unit 270) for preventing abuse of the emergency alert service. That is, the user may lock or release the emergency alert service using the first switching unit 270.

The audio processing unit 230 is connected to a microphone (MIC) and a speaker (SPK). The audio processing unit 230 converts voice signals from the microphone (MIC) into data and outputs the data to the controller 280. The audio processing unit 230 also converts voice signals/audio signals from the controller 280 into audible sounds and then outputs the audible sounds via the speaker (SPK). That is, the audio processing unit 230 converts analog voice signals, output from the microphone (MIC), into digital voice signals. The audio processing unit 230 also converts digital voice/audio signals, output from the controller 280, into analog voice/audio signals and then outputs the analog voice audio signal through the speaker (SPK). In an exemplary implementation, the audio processing unit 230 may reproduce audio components included in a variety of contents in the portable terminal, according to a user's selection.

The display unit 240 displays screen data, generated when the portable terminal is operated, and state information according to a user's key operation and function settings. The display unit 240 also displays screen data related to an emergency alert service according to the control of the controller 280. The display unit 240 displays signals and color information output from the controller 280. In an exemplary implementation, the display unit 240 may also display set effects according to the control of the controller 280 when the portable terminal provides the emergency alert service. For example, the display unit 240 displays a flickering effect as a backlight is turned on and off according to the control of the controller 280. More particularly, if the display unit 240 is implemented with a touch screen, the display unit 240 may also serve as an input device.

The storage unit 250 is composed of a Read Only Memory (ROM) and Random Access Memory (RAM). The storage unit 250 stores a variety of data generated and used in the portable terminal. The data may be created as application programs and executed in the portable terminal. The data is also acquired by the portable terminal or downloaded from an external system, such as a content server, a personal computer, and the like. It should be understood that the data may include various types of data that may be stored in the storage unit. In an exemplary implementation, the data includes source audio signal data to be used for the effects. The data also include setting information that is related to user interfaces and the use of the portable terminal.

In an exemplary implementation, the storage unit 250 stores setting information related to an emergency alert service, an SOS message, and setting information regarding effects that will be displayed when an emergency alert service is requested. The setting information, described above, may be stored in a setting information storage area (not illustrated) of the storage unit 250. The storage unit 250 stores application programs for processing operations of the portable terminal and operations related to the emergency alert service. The application programs process the operations related to the features of the present invention and may be stored in an application storage area (not illustrated) of the storage unit 250. The storage unit 250 may store data required when communication is performed via the RF communication unit 210. The storage unit 250 may also store various types of temporary data generated while the controller 280 processes corresponding operations and user data, such as phone numbers, ring tones, and the like.

The storage unit 250 may include at least one or more buffers that temporarily store data generated while the application programs are executed. In an exemplary implementation, the storage unit 250 may be implemented with internal storage media and thus installed within the portable terminal. It should be understood that the storage unit 250 may further include external storage media, such as a smart card.

The SOS input unit 260 corresponds to the SOS input unit 110 illustrated in FIG. 1. The SOS input unit 260 generates an SOS execution signal for providing an emergency alert service in response to a user's request, and transmits the SOS execution signal to the controller 280.

As described with reference to FIG. 1, the first switching unit 270 is switched on/off according to a control signal from the switch controlling unit 120. If the first switching unit 270 is switched on, the first switching unit 270 establishes a signal path between the SOS input unit 260 and the controller 280. That is, the first switching unit 270 performs a passing function to transfer an SOS execution signal, generated by the SOS input unit 260, to the controller 280.

The controller 280 controls the entire operation of the portable terminal. The controller 280 also controls signal flow among elements in the portable terminal. For examples, the elements may include the RF communication unit 210, the input unit 220, the audio processing unit 230, the display unit 240, the storage unit 250, the second switching unit 290, the source audio signal processor 300, and the like.

The controller 280 generates an SOS message and transmits the SOS message to at least one other portable terminal, which was previously set in the portable terminal when the portable terminal provides an emergency alert service. If the portable terminal is implemented with a terminal that does not support communication, such as an MP3 player, a PMP, and the like, the portable terminal does not perform the generation and transmission of an SOS message, but provides an emergency alert service.

In an exemplary implementation, the controller 280 identifies a current mode of the portable terminal in order to provide an emergency alert service and then performs corresponding processes for the emergency alert service based on the identified mode. More particularly, the controller 280 receives an SOS execution signal from the SOS input unit 260 via the first switching unit 270 and then identifies a current mode of the portable terminal in response to the SOS execution signal. The controller 280 generates a control signal for switching on the second switching unit 290, in response to the SOS execution signal.

The second switching unit 290 controls electrical power supplied to the source audio signal processor 300 and the output unit 310. That is, the second switching unit 290 breaks electrical power supplied to the source audio signal processor 300 and the output unit 310 in a normal state or in a state where an emergency alert service is not used, thereby reducing power consumption and preventing accidental user operation. However, if the portable terminal is implemented in such a way that the source audio signal processor 300 and the output unit 310 are always operated, the second switching unit 290 may not be required in the portable terminal. Accordingly, the controller 280 may directly transmit a control signal to the source audio signal processor 300.

The controller 280 transmits a mode control signal for commanding a corresponding mode to the source audio signal processor 300 in order to identify a mode of the portable terminal. The controller 280 may transmit the mode control signal to the source audio signal processor 300 via a General Purpose Input/Output Port (GPIO) corresponding to a mode that will be identified. The controller 280 identifies a mode of the portable terminal, calls an effect that will be performed in the identified mode according to preset information, and then outputs the effect. For example, the controller 280 turns on and off its backlight.

The controller 280 performs control operations as described with reference to FIG. 1 and will be explained in the following description with reference to FIGS. 3A and 3B to FIG. 6. A function control of the controller 280 may be implemented by software.

The controller 280 may include a baseband module. The baseband module performs conversion regarding a signal that will be transmitted through a channel coding operation and an interleaving operation, modulates the signal, and then outputs the signal to an RF module. The baseband module performs demodulating, equalizing, channel decoding, and de-interleaving operations regarding signals from the RF module. Although the baseband module is included in the controller 280, it should be understood that the baseband module is installed to both the controller 280 and the RF communication unit 210 or installed to the portable terminal, separating the controller 280 and the RF communication unit 210 therefrom. It will be appreciated that the baseband module may be omitted, according to the type of portable terminal operated.

As described with reference to FIG. 1, the second switching unit 290 passes electrical power Vcc from a battery to the source audio signal processor 300 and the output unit 310. The second switching unit 290 is switched on/off according to a control signal of the controller 280.

The second switching unit 290 may retain an off state before it receives a control signal to switch on from the controller 280. When the controller 280 detects an SOS execution signal from the SOS input unit 260, the controller 280 generates a control signal for operating the second switching unit 290 in response to the detected SOS execution signal, and transmits the control signal to the second switching unit 290. The second switching unit 290 is switched from off to on according to the control signal of the controller 280.

When the second switching unit 290 is switched on, signal paths are established between the battery and the source audio signal processor 300, and between the battery and the output unit 310, so that electrical power Vcc is supplied to the source audio signal processor 300 and the output unit 310.

The source audio signal processor 300 may be implemented with a source audio signal control chip that may control the output of source audio signals and may process the source audio signals to have a soundproof portion, or may delay transmission of the source audio signals. The source audio signal processor 300 includes input ports for receiving signals for controlling functions according to an exemplary embodiment of the present invention. The input ports are composed of power input ports and a plurality of mode input ports. The power input ports and the plurality of mode input ports may be implemented with GPIO pins. In an exemplary implementation, when an operation related to an emergency alert service is performed through the controller 280 or software, a certain command signal, generated by the controller 280 or software, is transferred to the source audio signal processor 300 via the GPIO, so that the source audio signal processor 300 performs a corresponding operation through the GPIO.

For example, the source audio signal processor 300 includes a power input port GPIO 4 for receiving electrical power from the battery and mode input ports GPIO 1, GPIO 2 and GPIO 3 for receiving control signals by modes for the portable terminal from the controller 280. More particularly, although the source audio signal processor 300 receives the mode control signals via the mode input ports GPIO 1, GPIO 2 and GPIO 3, the source audio signal processor 300 may be implemented in such a way that it receives the mode control signals via one of the mode input ports according to the mode of the portable terminal.

The source audio signal processor 300 may be operated as it receives electrical power Vcc from the battery via the power input port GPIO 4. That is, the source audio signal processor 300 receives the electrical power Vcc and activates a function for controlling the output of a source audio signal according to an emergency alert service. When the source audio signal processor 300 receives a control signal from the controller 280 via one of the mode input ports GPIO 1, GPIO 2 and GPIO 3, the source audio signal processor 300 outputs a source audio signal corresponding to the input control signal.

For example, it is assumed herein that the portable terminal is operated in three modes. A first mode is an idle mode where the portable terminal is in a standby state. A second mode is a call mode when the portable terminal is making a call with another portable terminal. A third mode is a miscellaneous mode where the portable terminal performs a certain function. It is also assumed herein that the control signals of the first, second and third modes are applied to the first, second and third mode input ports GPIO 1, GPIO 2 and GPIO 3, respectively.

Accordingly, when the source audio signal processor 300 detects a control signal via the first mode input port GPIO 1, the source audio signal processor 300 calls a preset source audio signal (i.e., an alarm sound) from the storage unit 250, and then outputs the source audio signal to the output unit 310.

When the source audio signal processor 300 detects a control signal via the second mode input port GPIO 2, the source audio signal processor 300 calls a preset source audio signal from the storage unit 250. The source audio signal processor 300 processes the source audio signal to have a soundproof portion for a certain period of time or a certain section, and then outputs the processed source audio signal to the output unit 310. Alternatively, the source audio signal processor 300 delays transmission of the source audio signal for a certain period of time and then outputs the delayed source audio signal to the output unit 310.

When the source audio signal processor 300 detects a control signal via the third mode input port GPIO 3, the source audio signal processor 300 does not perform an operation to output a source audio signal or calls a preset source audio signal from the storage unit 250 and then outputs the source audio signal to the output unit 310.

As described above, the modes, input ports by modes and source audio signals by modes may be set differently in the portable terminal according to a user's environment or preference. The user may also directly set the settings.

The output unit 310 receives a source audio signal from the source audio signal processor 300 and outputs the source audio signal. The output unit 310 may amplify the source audio signal before outputting the source audio signal. The output unit 310 may be implemented with a separate speaker (SPK) or buzzer as illustrated in FIG. 2. In an exemplary implementation, a receiver performs the function of the output unit 310. The receiver may also be a speaker (SPK) connected to the audio processing unit 230.

FIG. 2 illustrates the configuration of the portable terminal to describe the features of the present invention. Therefore, it should be understood that the portable terminal according to an exemplary embodiment of the present invention is not limited thereto. For example, according to the type of potable terminal, the portable terminal may further include a digital broadcast receiving module, a short-range communication module, a camera module, an Internet communication module, and the like.

It will be appreciated that part of the elements may be removed or replaced with other elements.

For example, if the portable terminal supports short-range RF communication, such as BLUETOOTH or ZIGBEE, it may further include a short-range communication module. The short-range communication module performs short-range RF communication with other portable terminals according to the control of the controller 280. If the portable terminal supports communication via an Internet network, it may further include an Internet communication module. The Internet communication module performs RF communication with the other portable terminals and networks via the Internet network, according to the control of the controller 280.

If the portable terminal provides functions related to digital broadcasting, the portable terminal may further include a digital broadcast receiving module. If the portable terminal is an MP3 player, a PMP, a PDA, and the like, it may not require the RF communication unit 210 and removes a baseband module from the controller 280. If the portable terminal does not need a power supply operation via the second switching unit 290, the portable terminal may not include the second switching unit 290.

As described above, the portable terminal, according to an exemplary embodiment of the present invention, can rapidly and correctly inform other portable terminals of an emergency situation, thereby providing convenience and safety to the user.

In the following description, the operations of the first switching unit 270 and the second switching unit 290 are explained with reference to FIGS. 3A and 3B.

Figure 3A:
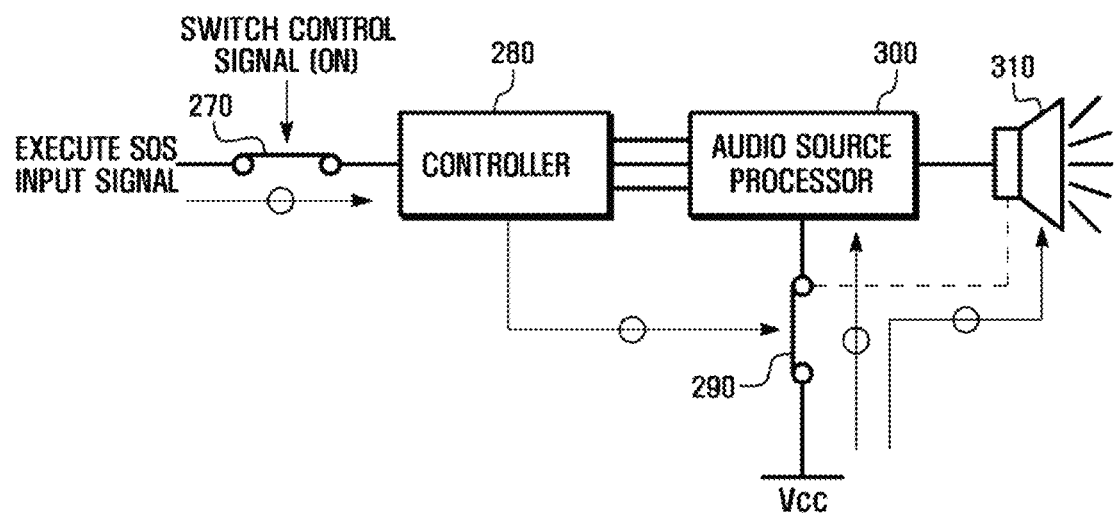
FIGS. 3A and 3B are schematic block diagrams describing operations of elements in a portable terminal providing an emergency alert service by switching operations according to an exemplary embodiment of the present invention.
Figure 3B:
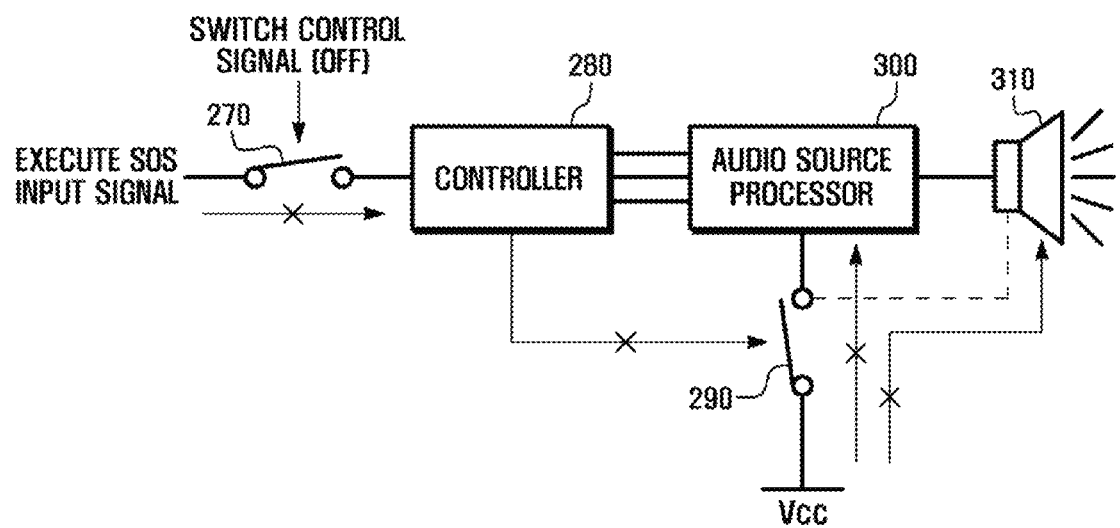

FIGS. 3A and 3B are schematic block diagrams describing operations of elements in a portable terminal providing an emergency alert service by switching operations according to an exemplary embodiment of the present invention. More particularly, FIG. 3A illustrates a state where the first switching unit 270 is switched on and FIG. 3B illustrates a state where the first switching unit 270 is switched off.

Referring to FIGS. 3A and 3B, the first switching unit 270 receives an SOS execution signal from the SOS input unit 260 and is switched on or off, so that the SOS execution signal may be transferred to the controller 280 (illustrated in FIG. 3A) or may not be transferred to the controller 280 (illustrated in FIG. 3B).

As illustrated in FIG. 3A, the first switching unit 270 passes the SOS execution signal to the controller 280. When the controller 280 receives the SOS execution signal, the controller 280 generates a control signal for switching on the second switching unit 290. When the second switching unit 290 is switched on according to the control signal from the controller 280, the electrical power Vcc is supplied from the battery to the source audio signal processor 300 and the output unit 310. After receiving the electrical power Vcc, the source audio signal processor 300 and the output unit 310 perform corresponding operations.

As illustrated in FIG. 3B, the first switching unit 270 is switched off, so that the SOS execution signal cannot be transferred to the controller 280, although the SOS input unit 260 generates the SOS execution signal. Accordingly, the controller 280 does not generate a signal for controlling the second switching unit 290. Since the second switching unit 290 is switched on, electrical power Vcc is not supplied to the source audio signal processor 300 and the output unit 310.

The operation illustrated in FIG. 3B is to prevent abuse and accidental operation of the emergency alert service. The operation may be set or configured in portable terminals by a user's settings or by the selection of portable terminal manufacturers.

In the following description, a control operation for processing an emergency alert service is explained in more detail with reference to FIGS. 4 and 5. It should be understood that the present invention is not limited thereto. It will be appreciated that the emergency alert service may be implemented with various modifications.

FIG. 4 is a flowchart describing a control operation for providing an emergency alert service in a portable terminal according to an exemplary embodiment of the present invention. The controller 280 performs the control operation.

Referring to FIG. 4, while the portable terminal is operating in a particular mode in step 401, the controller 280 detects an SOS execution signal in step 403. For example, the particular mode may include an idle mode, a call mode, a miscellaneous mode, and the like. That is, while the portable terminal is operated in one of the modes, if the SOS input unit 110 is slid and an SOS execution signal is generated accordingly, the controller 280 detects the SOS execution signal. Meanwhile, if the first switching unit 270 is in a switched off state via the locking function of the switch controlling unit 120, the SOS execution signal cannot be transferred to the controller 280.

After detecting the SOS execution signal in step 403, the controller 280 generates an SOS message for providing an emergency alert service and then transmits the SOS message to at least one other called portable terminal whose phone number is previously set in the caller portable terminal in step

405. If the portable terminal is a terminal, such as an MP3 player, the portable terminal does not need to perform step 405. Therefore, it should be understood that step 405 may be conducted while the emergency alert service is being performed or after the emergency alert service is performed.

The controller 280 then identifies a mode of the portable terminal in step 407. The controller 280 establishes a path for outputting a control signal corresponding to the identified mode in step 409. The controller 280 also generates a control signal for switching on the second switching unit 290 and controls the switching state of the second switching unit 290 in step 411.

Next, the controller 280 outputs the control signal to the source audio signal processor 300 via the established path in step 413. The controller 280 identifies an effect set according to the identified mode of the portable terminal in step 415, and then outputs the identified effect in step 417. For example, the effect may be a flickering operation where the display unit 240 is flickered by turning on and off the backlight. More particularly, if the portable terminal includes an additional Light Emitting Diode (LED), the effect may be displayed by turning on the LED.

Figure 5:
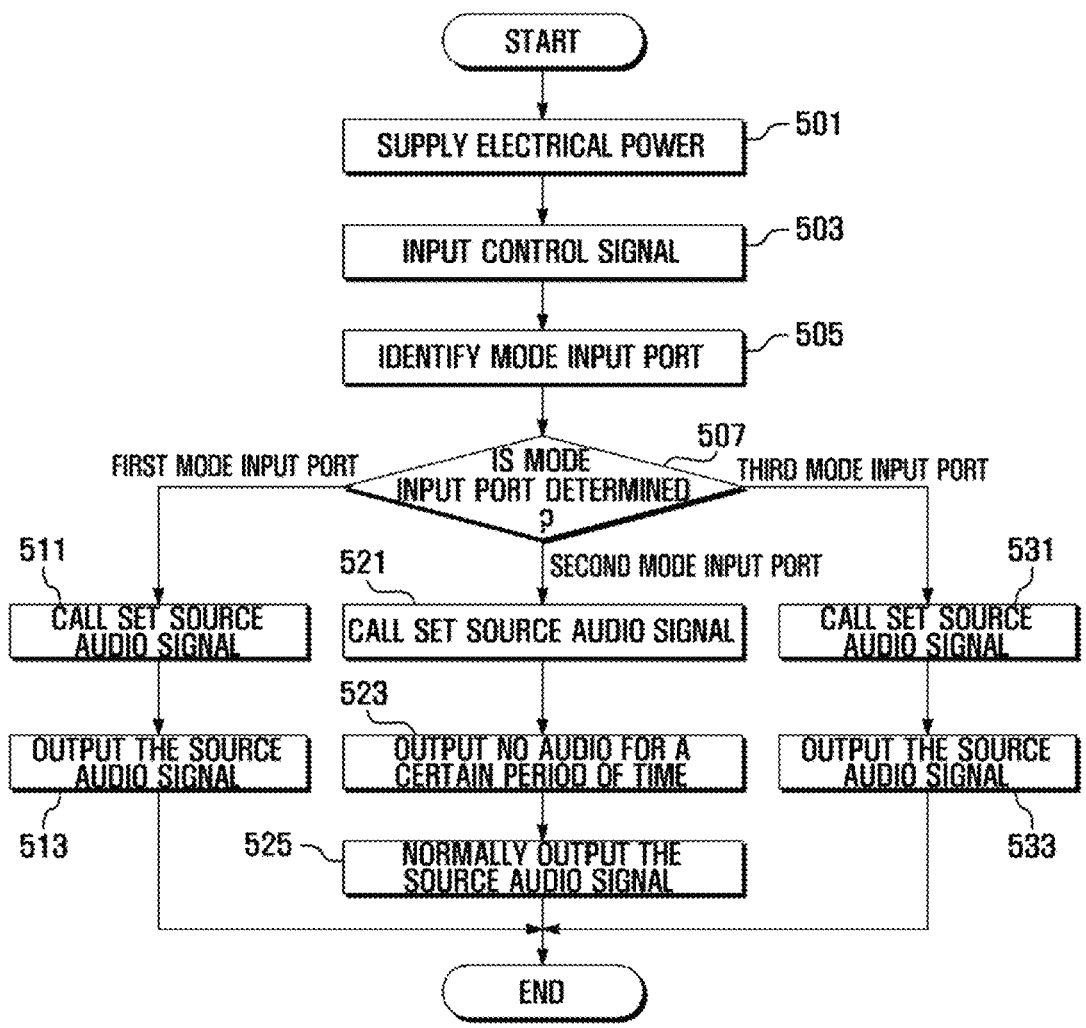
FIG. 5 is a flowchart describing a control operation for providing an emergency alert service in a portable terminal according to an exemplary embodiment of the present invention.

FIG. 5 is a flowchart describing a control operation for providing an emergency alert service in a portable terminal according to an exemplary embodiment of the present invention. The source audio signal processor 300 performs the control operation.

Referring to FIG. 5, when the source audio signal processor 300 receives electrical power Vcc via the power input port in step 501, the source audio signal processor 300 activates a function to control the output of a source audio signal. The source audio signal processor 300 receives a control signal from the controller 280 via mode input ports in step 503. The source audio signal processor 300 identifies a corresponding mode input port receiving the control signal in step 505, and then outputs a source audio signal corresponding to the identified mode input port, i.e., a source audio signal according to a mode where the portable terminal is being performed in step 507.

If the source audio signal processor 300 receives a control signal via the first mode input port in steps 505 and 507, where the control signal corresponds to an idle state, the source audio signal processor 300 calls a preset source audio signal (e.g., an alarm sound) in step 511 and then outputs the preset source audio signal to the output unit 310 in step 513.

If the source audio signal processor 300 receives a control signal via the second mode input port in steps 505 and 507, where the control signal corresponds to a call mode, the source audio signal processor 300 calls a preset source audio signal (e.g., an alarm sound) in step 521, processes the source audio signal to have a soundproof portion for a certain period of time or a certain section in step 523, and then outputs the source audio signal to the output unit 310 in step 525. Therefore, the output unit 310 receives the source audio signal with a soundproof portion and outputs a sound corresponding to the source audio signal with the soundproof portion, which corresponds to the certain period of time or the certain section. Alternatively, the source audio signal processor 300 delays transmission of the called source audio signal to the output unit 310 for a certain period of time and then outputs the source audio signal processor to the output unit 310. Accordingly, the portable terminal user may be protected against a sudden output of a source audio signal in a call mode.

Additionally, if the source audio signal processor 300 receives a control signal via the third mode input port in steps 505 and 507, where the control signal corresponds to another mode, the source audio signal processor 300 calls a preset source audio signal in step 531. Miscellaneous modes are modes other than the idle state or the call mode. For example, the miscellaneous modes may include a multimedia performing mode, a text message writing mode, and the like. The called source audio signal is then output via the output unit 310 in step 533. In another mode, the source audio signal processor 300 may not perform an outputting operation of the source audio signal or may process the source audio signal to have a soundproof portion and then output the source audio signal to the output unit 310. If the portable terminal is switched from one mode to an idle mode or a call mode, the portable terminal stops processing the source audio signal to have a soundproof portion and then outputs a normal source audio signal to the output unit 310.

As described above, the method and apparatus, according to exemplary embodiments the present invention, can allow a user to easily operate an emergency alert function in a portable terminal and activate/deactivate an emergency alert function in a portable terminal, so that abuse of the emergency alert service can be prevented. The portable terminal activated in an emergency alert function can provide an alarm sound by outputting a source audio signal, thereby protecting the portable terminal user against an emergency situation.

The portable terminal according to an exemplary embodiment of the present invention can provide an emergency alert service irrespective of its current operating mode. More particularly, the portable terminal can control the output of a source audio signal corresponding to its current operating mode when it provides an emergency alert service, so that the portable terminal can protect a user against a sudden output of the source audio signal in a call mode.

The above-described methods according to the present invention can be realized in hardware or as software or computer code that can be stored in a recording medium such as a CD ROM, a RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method for providing an emergency alert service in a portable terminal of a wireless communication network, the method comprising:

detecting, by a controller, an SOS execution signal generated by an SOS input unit of the portable terminal in response to a user's request;

identifying, by the controller, an operating mode of the portable terminal in response to the SOS execution signal;

transmitting, by the controller, a control signal corresponding to the identified operating mode to a source audio signal processor; and generating, by the source audio signal processor, a source audio signal according to the received control signal for outputting the source audio signal via a sound output unit of the portable terminal, wherein the generating of the source audio signal comprises:
receiving the control signal from the controller; and
retrieving the source audio signal corresponding to the received control signal among a plurality of source audio signals for outputting the source audio signal via the sound output unit, and wherein, when the operating mode is identified as a call mode, the generating of the source audio signal comprises controlling output of the source audio signal by delaying the output of the source audio signal.

2. The method of claim 1, wherein the detecting of the SOS execution signal comprises:
activating an electrical power supply line of the source audio signal processor; and
outputting the source audio signal, if the source audio signal processor receives electrical power via the electrical power supply line.

3. The method of claim 2, further comprising:
generating the SOS execution signal in the SOS input unit of the portable terminal; and
transferring the SOS execution signal to the controller via a first switching unit,
wherein the first switching unit controls the transferring of the SOS execution signal.

4. The method of claim 3, further comprising:
switching the SOS execution signal received from the SOS input unit by at least one of physically opening and physically closing a first switching unit in order to transfer or break the SOS execution signal based on a preset SOS alarm configuration of the first switching unit;
transferring the SOS execution signal to the controller when the first switching unit is switched on; and
breaking the SOS execution signal when the first switching unit is switched off.

5. The method of claim 4, wherein the transferring and the breaking of the SOS execution signal is performed by a switch controlling unit that is installed externally.

6. The method of claim 1, further comprising:
outputting, by the controller, a preset effect corresponding to the identified operating mode of the portable terminal.

7. The method of claim 2, wherein:
the activating of the electrical power supply line of the source audio signal processor comprises switching on a second switching unit; and
the second switching unit controls the electrical power supply according to control signals of the controller, and performs at least one of passing electrical power from the power supply to the source audio signal processor if the second switching unit is switched on according to the control signal and interrupting electrical power from the electrical power supply to the source audio signal processor if the second switching unit is switched off according to the control signal.

8. The method of claim 2, wherein the outputting of the source audio signal comprises:
identifying, if electrical power is applied to a power supply port, a mode input port that receives a control signal from the controller; and outputting the source audio signal corresponding to the identified mode input port externally.

9. The method of claim 8, wherein the outputting of the source audio signal comprises:
processing the source audio signal to have a soundproof portion for a certain period of time, and performing at least one of outputting the processed source audio signal and delaying transmission of the source audio signal for a certain time period and outputting the delayed source audio signal.

10. The method of claim 8, wherein the outputting of the source audio signal comprises:
retrieving, by the source audio signal processor, a preset source audio signal corresponding to the identified operating mode and outputting the preset source audio signal to at least one of a speaker and an output unit of the portable terminal.

11. A portable terminal of a wireless communication network, the portable terminal comprising:
an SOS input unit for generating an SOS execution signal in response to a request;
a controller for detecting the SOS execution signal generated by the SOS input unit, identifying an operating mode of the portable terminal in response to the SOS execution signal, and transmitting a control signal corresponding to the identified operating mode to a source audio signal processor; and
the source audio signal processor generating a source audio signal according to the received control signal for outputting the source audio signal via a sound output unit of the portable terminal,
wherein the generating of the source audio signal comprises:
receiving the control signal from the controller; and
retrieving the source audio signal corresponding to the received control signal among a plurality of source audio signals for outputting the source audio signal via the sound output unit, and
wherein, when the operating mode is identified as a call mode, the generating of the source audio signal comprises controlling output of the source audio signal by delaying the output of the source audio signal.

12. The portable terminal of claim 11, further comprising:
a first switching unit for at least one of physically opening and physically closing the first switching unit in order to transfer or break the SOS execution signal received from the SOS input unit based on a preset SOS alarm configuration of the first switching unit; and
a switch controlling unit for switching on and off the first switching unit.

13. The portable terminal of claim 12, further comprising:
the output unit for outputting a sound corresponding to the source audio signal generated by the source audio signal processor; and
a storage unit for storing setting information related to an emergency alert service, an SOS message, setting information regarding effects and source audio signals set by modes of the portable terminal.

14. The portable terminal of claim 12, wherein the first switching unit performs at least one of transferring the SOS execution signal to the controller when the first switching unit is switched on according to control of the switch controlling unit and breaking the SOS execution signal when the first switching unit is switched off.

15. The portable terminal of claim 13, further comprising a second switching unit for passing electrical power from a power supply to the source audio signal processor via a switched path, wherein the second switching unit is activated by a control signal of the controller.

16. The portable terminal of claim 15, wherein:

the controller generates a first control signal and a second control signal according to the identified operating mode of the portable terminal;

the second switching unit is activated by the first control signal and the second switching unit passes electrical power from the power supply to the source audio signal processor; and the source audio signal processor is activated by receiving electrical power via the second switching unit and outputs the source audio signal corresponding to a mode input port that receives the second control signal.

17. The portable terminal of claim 16, wherein the second switching unit controls the electrical power supply according to control signals of the controller, and performs at least one of passing electrical power from the electrical power supply to the source audio signal processor if the second switching unit is switched on according to the control signal and interrupting electrical power from the electrical power supply to the source audio signal processor if the second switching unit is switched off according to the control signal.

18. The portable terminal of claim 17, wherein the source audio signal processor comprises:

an electrical power input port; and a plurality of mode input ports, wherein the source audio signal processor receives electrical power from the power supply via the electrical power input port and the control signal from the controller via one of the plurality of mode input ports.

19. The portable terminal of claim 18, wherein the source audio signal processor receives a control signal corresponding to one of an idle mode, a call mode and a miscellaneous mode, via one of the plurality of mode input ports.

* * * * *